Figure 2:
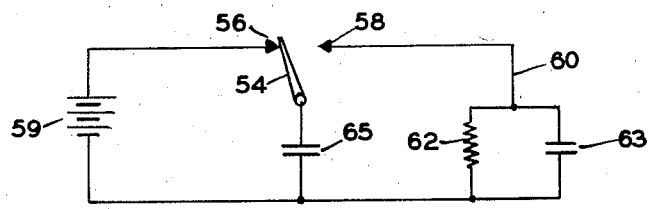

Jan. 21, 1958     H. G. ELWELL, JR     2,820,939

INDICATING SYSTEM

Filed Dec. 17, 1951

INVENTOR.
HENRY G. ELWELL JR.
BY
C. R. Miranda
ATTORNEY

United States Patent Office 2,820,939
Patented Jan. 21, 1958

2,820,939

INDICATING SYSTEM

Henry G. Elwell, Jr., Hackensack, N. J., assignor to Bendix Aviation Corporation, Teterboro, N. J., a corporation of Delaware Application December 17, 1951, Serial No. 262,151

11 Claims. (Cl. 318—309)

This invention relates to indicating systems and more particularly to a system for measuring and indicating the flow of a fluid through a conduit.

Heretofore, some of the systems of the type mentioned above comprised a transmitter signal generator which developed a signal corresponding to the flow of fluid together with an amplifier to amplify the signal in order to drive a two-phase motor. Connected to the motor was a rate generator which developed a rate signal, opposite in phase to the transmitter signal, and corresponding to the speed of the motor. The rate signal was fed back in series with the transmitter signal to effect an error or differential signal to run the motor at the calibrated speed for the particular fluid flow. Indicator means, driven by the motor, were provided to indicate the rate of fluid flow at any instant and the quantity of fluid which passed through the conduit during any time interval.

This type of system has been found to be unsatisfactory in some cases because of large errors in the system. Experiments conducted for determining the cause of such errors established that when the rate generator was affected by extreme changes in ambient temperatures, wide variation in amplitude and phase of the rate signal resulted.

The present invention therefore, contemplates a highly accurate fluid flow measuring and indicating system wherein the rate generator is unaffected by ambient temperture changes to produce an accurate rate signal. According to the present invention, the rate generator comprises a movable contact which is successively switched by the motor between two positions for connection to a resistor-capacitor network to produce a D. C. rate signal corresponding to the speed of the motor. Means are provided to convert the transmitter A. C. signal to a D. C. signal so that the latter may be combined with the D. C. rate signal by means including a synchronous vibrator which alternately samples the two D. C. signals to effect a difference or error signal to drive the motor.

An object of the present invention, therefore, is to provide an improved and highly accurate fluid flow measuring and/or indicating system.

Another object is to provide a fluid flow measuring and indicating system which employs a rate generator for producing a feedback rate signal unaffected by changes in ambient temperature.

A further object is to provide a fluid flow measuring and indicating system wherein a D. C. transmitter signal representing fluid flow and a D. C. feedback rate signal are alternately sampled and combined to effect a differential or error signal of sufficient amplitude to run a motor at a calibrated speed for a particular fluid flow.

The above and other objects and advantages of the present invention will appear more fully from a consideration of the detailed description which follows taken together with the accompanying drawing wherein one embodiment of the invention is illustrated.

Figure 1:
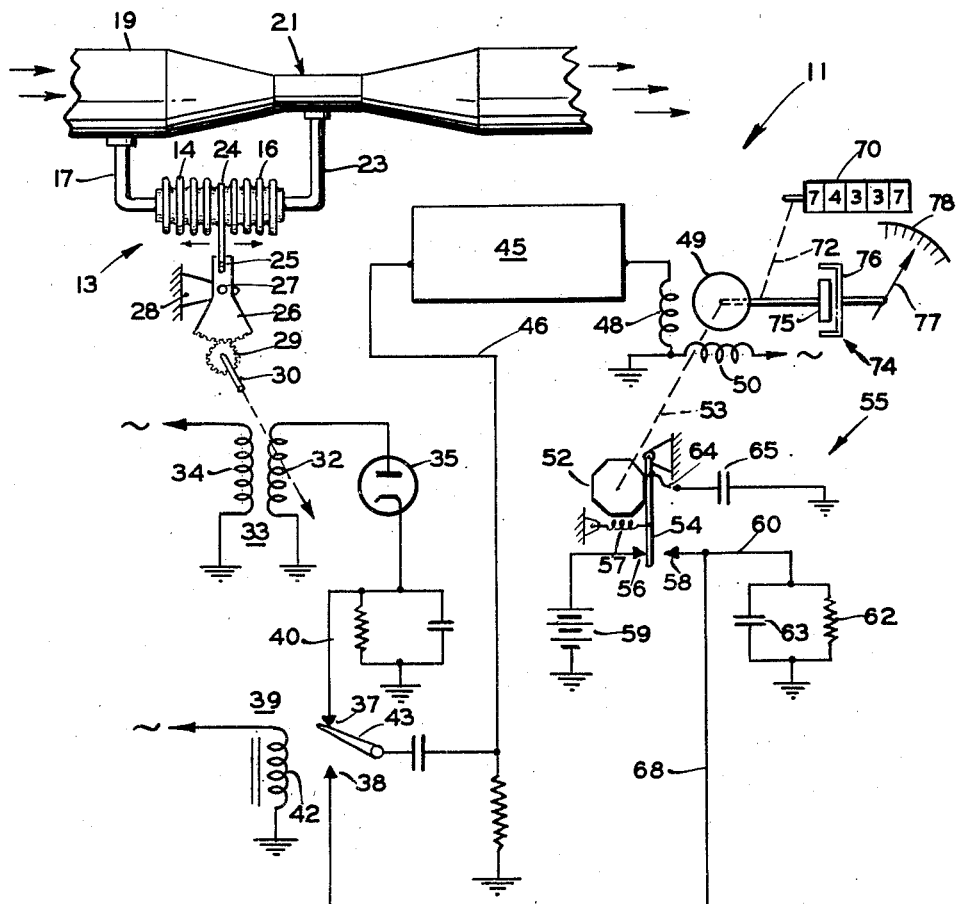

In the drawing wherein like reference characters refer to like parts throughout the several views:

Fig. 1 is a diagrammatic illustration of the fluid flow measuring and indicating system embodying the present invention; and Fig. 2 is a schematic representation of a resistor-capacitor network for deriving the rate signal of the present invention.

Referring now to the drawing for a more detailed description of the present invention, and more particularly to Fig. 1 wherein one embodiment hereof is clearly illustrated, a fluid flow measuring and indicating system generally designated by the numeral 11 comprises a differential pressure bellows motor 13 which includes a pair of expansible and contractible bellows 14 and 16, respectively. Connected to the interior of bellows 14 is a pipe 17 which introduces the pressure of fluid flow in a conduit 19 from the high pressure side of a venturi 21 formed in the conduit. The interior of bellows 16 is subjected to fluid flow pressure on the low pressure side of venturi 21 by a pipe 23 connected to the conduit. Secured to adjacent ends of bellows 14 and 16 is a circular plate 24 which seals the bellows from each other. When fluid is flowing in conduit 19 motion of plate 24 is effected due to the differential pressure existing across the bellows. As is well understood to those skilled in the art, the movement of plate 24 corresponds to the square root of the pressure drop in the venturi and since the magnitude of flow of fluid through a venturi is equal to a constant times the square root of the pressure drop therein, motion of plate 24 may be measured to effect indications of rate of flow of fluid. Spring means (not shown) are employed with the bellows to effect linear motion of the plate with changes in flow of the fluid.

Plate 24 has secured thereto a pin 25 which extends into the bifurcated end of a gear sector 26 which is adapted to be pivoted about a pin 27 secured to a fixed mounting bracket 28. Sector 26 has a toothed portion which meshes with a pinion 29 mounted on an actuating shaft 30, a continuation of which is shown in broken lines directly connected to an angularly displaceable secondary winding 32 of a variable transformer or signal generator 33. Inductively coupled with winding 32 is a stationary primary winding 34 forming part of the transformer 33 and energized from a suitable source of alternating current, such as a 400 cycle source.

The output of winding 32 is found by multiplying the exciting voltage applied to the primary winding by the cosine of $\theta$, the latter being the angle between windings 32 and 34. Since the excitation is constant, the magnitude of the signal from winding 32 corresponds to the angular displacement of the latter winding from null. From the foregoing. it is apparent that the above relation may be used in the present system to produce an electrical signal proportional to the rate of flow of the fluid inasmuch as the motion of plate 24 corresponds to flow rate.

The A. C. signal from winding 32 is converted, by a half-wave rectifier tube 35 having its cathode connected to ground through a parallel-connected resistor 31 and condenser 36, to a D. C. signal which appears at a contact 37 of a synchronous vibrator 39 by way of an output lead 40. Vibrator 39 comprises a winding 42 supplied with 400 cycle current and a single-pole double-throw electrical contact member 43 which is connected to a condenser 41 and resistor 44 connected to an amplifier 45. In conjunction with condenser 41 and resistor 44, contact 43 alternately engages contact 37 and a second contact 38 connected to a rate signal generator 55 to change the D. C. signal to an A. C. signal of square wave form for a purpose to be explained later. The A. C, signal is connected to the input of a conventional amplifier 45, shown as a box, by way of a conductor 46. Connected to the output of amplifier 45 is the variable phase winding 48 of a two phase variable speed motor 49 which includes a fixed phase winding 50 energized from a fixed source of alternating current. The signal output from amplifier 45 determines the speed of motor 49 whereby the speed of the motor, in effect, corresponds to the signal from transmitter signal generator 33.

Motor 49 drives a contoured wheel 52 through a gear train having a 1:1 gear ratio, shown in Fig. 1 as a broken line connection 53. Wheel 52 engages a single-pole double-throw electrical contact member 54 which forms part of a rate signal generator generally designated by the numeral 55 and is successively moved to two positions to make electrical contact with contacts 56 and 58. Contact member 54 is normally urged into engagement with contact 56 by a spring 57. Contact 56 is connected to one side of a battery 59 while contact 58 is connected to a conductor 60 of a capacitor-resistor network comprising a parallel connected resistor 62 and a capacitor 63 connected to the other side of the battery through ground. Contact member 54, on the other hand, is connected by lead 64 to a capacitor 65 which is connected to the negative side of battery 59 through ground. The foregoing arrangement, provides for a D. C. signal when motor 49 is operating, which corresponds to the speed of the motor.

In order to understand the principle of operation of the rate generator more clearly, the circuitry thereof is illustrated in Fig. 2, identical elements being designated with the same reference characters. It was determined that the voltage appearing across parallel connected resistor 62 and capacitor 63 would increase in a proportional manner with the frequency with which it was charged from fixed capacitor 65, the latter obtaining its voltage from a fixed source, such as battery 59. The values of resistor 62 and capacitor 65 were chosen so that their time constant was much less than the time constant of resistor 62 and capacitor 63. In operation, when capacitor 65 is connected to contact 56 by contact member 54, the capacitor receives a charge from battery 59. Contact member 54 is then switched to contact 58 so that capacitor 65 discharges through resistor 62 whereby the voltage across the resistor charges capacitor 63 slightly. If no further switching operation occurs, capacitor 63 will discharge through resistor 62 at a rate determined by the time constant or product of the resistance and capacitance of resistor 62 and capacitor 63, respectively. Now, if capacitor 65 is successively switched from contact 56 to contact 58, energy will be transferred from capacitor 65 to capacitor 63 faster than the resistor can discharge capacitor 63 so that a voltage proportional to the switching speed will develop across resistor 62 and capacitor 63. This voltage will be then the D. C. rate signal developed by rate generator 55 and is of the same polarity as the transmitter D. C. signal.

The rate signal developed by generator 55 is made free of ambient temperature changes by selecting zero temperatures, coefficient resistors and capacitors for the resistor 62 and capacitors 63 and 65. Inasmuch as zero temperature coefficient electrical elements are well known in the art, it is believed unnecessary to go into a discussion of them in further detail.

The D. C. rate signal is applied to second contact 38 of vibrator 39 by way of a conductor 68 where it is compared with the signal from signal generator 33. It is apparent that energization of winding 42 will cause contact member 43 to alternately sample the D. C. voltages at contacts 37 and 38 at a 400 cycle per second rate and, in conjunction with condenser 41 and resistor 44, to effect a differential or error A. C. signal of square wave form which is fed to amplifier 45 by way of conductor 46 to energize variable phase winding 48 of motor 49. Considering ground as the reference potential, it will be apparent from Fig. 1 that a 400 cycle pulsating D. C. signal of substantially square wave form appears on contact 43 and the left-hand electrode of condenser 41 and that a differential or error A. C. signal of substantially square wave form and proportional to the difference between the magnitudes of the two D. C. voltages appears at the right-hand electrode of condenser 41 and at the input to the amplifier.

It may now be seen that the A. C. signal from transformer 33 is rectified by tube 35 because vibrator 39 produces the D. C. rate signal as pulsating D. C. in a square wave form whereas the output from the transformer is in a sine wave form, and the mixing of a square wave output and sine wave output is not desirable. The foregoing system is so calibrated that the rate signal is always less than the transmitter signal and the resultant error signal will have increased values for increased rates of fluid flow whereby the speed of motor 49 will be increased proportionately.

If the flow through conduit 19 should increase, the displacement of plate 24 from its normally centered position and hence the angular displacement of winding 32 will be further increased causing a temporary large error signal, at that instant, to be applied to the motor thereby increasing the speed thereof. This increased speed will cause an increased frequency of switching motion of contact member 54 to increase the rate signal thereby decreasing the temporary large error signal supplied to motor 49 tending to reduce the speed thereof until an equilibrium is established corresponding to the new position of plate 24. When the increased rate of flow becomes constant, the error signal will have a greater value than the value of the error signal when the rate of flow was less, and correspondingly the motor speed will be greater. In this manner, the error signal may be made to correspond to the rate of fluid flow.

By integrating the rate of flow over the period of time fluid has been flowing, a measure of the quantity of fluid which has passed through conduit 19 will be obtained. As the rotation of motor 49 is unidirectional, the total number of revolutions of the motor taken over a period of time will be proportional to the quantity of fluid passing through the conduit during the same period of time. By connecting a counter 70 to motor 49 through a reduction gear train (not shown), but illustrated as a broken line 72, and by properly proportioning the ratio between the gears (not shown), the counter will furnish an indication of quantity of fluid which passed through the conduit. To obtain an instantaneous indication of rate of fluid flow, motor 49 is connected to the input end of a slip coupling 74 here schematically illustrated as a magnetic drag cup. The input end of coupling 74 comprises a bar magnet 75 which rotates within a drag cup 76 connected to a pointer 77 movable relative to a scale 78 calibrated in rate of flow units. In this manner, the instantaneous rate of fluid flow may be read directly on scale 78.

It will now be readily apparent that the present invention provides a highly accurate fluid flow measuring and indicating system wherein the rate signal developed by the rate generator is independent of changes in ambient temperature affecting the generator. Furthermore, the provision of a rate generator which provides a D. C. feedback signal which mixes with a D. C. signal representing fluid flow to effect an A. C. error signal enables the system to function accurately.

Although one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

I claim:

1. In a fluid flow measuring system wherein means are provided for sensing the rate of fluid flow through a conduit, the combination comprising means responsive to said sensing means for producing a signal corresponding to the rate of fluid flow, a variable speed motor operated in accordance with said signal, means operated by said motor for providing a second signal substantially proportional to the speed of said motor, means including alternately operable means for receiving and comparing both of said signals and for developing a third signal representing the difference between said first two signals for controlling the speed of operation of said motor.

2. In a system of the type described, means for developing an alternating current signal corresponding to a variable condition being measured, a variable speed motor operated in accordance with said signal, means comprising a movable contact controlled by said motor and adapted to be successively switched to two positions, a capacitor adapted to be connected to a D. C. source when said contact is moved to one position, a parallel-connected resistor and capacitor adapted to be connected in parallel with said first capacitor when said contact is moved to the other position, the time constant of said parallel-connected resistor and capacitor being greater than the time constant of said resistor and first capacitor, whereby the first capacitor discharges through said resistor to develop a D. C. signal across said parallel-connected resistor and capacitor corresponding to the speed of operation of said motor when said contact is successively switched between said two positions, means for converting said first signal into a second direct current signal, and means for comparing both of said direct current signals and for developing an alternating current control signal in accordance with the difference of said direct current signals for controlling the speed of operation of said motor.

3. In a system of the type described, means for developing an alternating current signal corresponding to a variable condition being measured, a variable speed motor operated in accordance with said signal, means comprising a movable contact controlled by said motor and adapted to be successively switched to two positions, a capacitor adapted to be connected to a D. C. source when said contact is moved one position, a parallel-connected resistor and capacitor adapted to be connected in parallel with said first capacitor when said contact is moved to the other position, the time constant of said parallel connected resistor and capacitor being greater than the time constant of said resistor and first capacitor, whereby the first capacitor discharges through said resistor to develop a direct current signal across said parallel connected resistor and capacitor corresponding to the speed of operation of said motor when said contact is successively switched between said two positions, means for converting said first signal into a second direct current signal, and means including a synchronous vibrator for comparing both of said direct current signals and for developing an alternating current control signal in accordance with the difference of said direct current signals, said vibrator being in circuit with said motor for making the latter responsive to said control signal to control the speed of operation of said motor.

4. In a motor control system, means providing a unidirectional voltage corresponding to a variable condition being measured, a variable speed motor operated in accordance with said voltage, means adapted to be connected to a fixed source of unidirectional voltage for receiving and retaining a charge therefrom, means operable by said motor for successively connecting said source to the second mentioned means and for disconnecting it from the latter, means for receiving the successive charges from said second mentioned means when the latter is disconnected from said source and for storing said charges to provide a unidirectional voltage corresponding to the speed of operation of said motor, and means connected to receive both said first and second mentioned unidirectional voltages and comparing the latter to provide a third voltage for controlling the speed of operation of the motor.

5. In a system of the class described, means providing a unidirectional voltage corresponding to a variable condition being measured, a variable speed motor operated in accordance with said voltage, a capacitor adapted to be connected to a fixed source of unidirectional voltage for receiving and retaining a charge therefrom, means operable by said motor for successively connecting said source to said capacitor and for disconnecting it from the latter, a parallel connected resistor and capacitor adapted to be connected in parallel with said first capacitor when the latter is disconnected from said source for receiving and for storing said charges to provide a unidirectional voltage corresponding to the speed of operation of said motor, and means connected to receive both said first and second mentioned unidirectional voltages and comparing the latter to provide a third voltage for controlling the speed of operation of the motor.

6. In a system of the class described, means providing a unidirectional voltage corresponding to a variable condition being measured, a variable speed motor operated in accordance with said voltage, a capacitor adapted to be connected to a fixed source of unidirectional voltage for receiving and retaining a charge therefrom, means operable by said motor for successively connecting said source to said capacitor and for disconnecting it from the latter, storage means comprising a resistor and a second capacitor adapted to be connected to said first capacitor for receiving and storing the successive charges from said first capacitor when the latter is disconnected from said source, said resistor and second mentioned capacitor having a time constant greater than the time constant of said resistor and first mentioned capacitor whereby the first capacitor discharges through said resistor to develop a unidirectional voltage across said resistor and second mentioned capacitor corresponding to the speed of operation of said motor, and means connected to receive both said first and second mentioned unidirectional voltages and comparing the latter to provide a third voltage for controlling the speed of operation of said motor.

7. In a motor control system, a source of A. C. voltage of substantially constant magnitude and frequency, means for developing an A. C. signal corresponding to a variable condition being measured, means for converting said A. C. signal into a D. C. signal, an amplifier having an input circuit and an output circuit, a variable speed A. C. motor having one field winding coupled to said source and a control field winding coupled to the output circuit of said amplifier, means controlled by said motor for developing a D. C. signal corresponding to the speed of operation of said motor, and means for comparing both of said D. C. signals and developing an A. C. control signal in accordance with the difference of said D. C. signals for controlling the speed of operation of said motor so that the magnitude of said second-mentioned D. C. signal approaches but never equals the magnitude of said first-mentioned D. C. signal, said last-mentioned means including a capacitor and resistor coupled to the input circuit of said amplifier and a synchronous vibrator having a control winding connected for energization from said source, said vibrator having a single-pole double-throw contact coupled to said capacitor and resistor and vibrated by said control winding alternately to receive said D. C. signals.

8. In a fluid flow measuring system wherein means are provided for sensing the rate of fluid flow through a conduit, means responsive to said sensing means for producing a signal corresponding to the rate of fluid flow, a variable speed motor operated in accordance with said signal, means controlled by said motor for providing a second signal corresponding to the speed of operation of said motor, and means including alternately operable means for comparing both of said signals and for developing a third signal having a magnitude which represents the difference between said first two signals for controlling the speed of operation of said motor.

9. In a fluid flow measuring system wherein means are provided for sensing the rate of fluid flow through a conduit, means responsive to said sensing means for developing an alternating current signal corresponding to the rate of fluid flow, a variable speed motor operated in accordance with said signal, means controlled by said motor for developing a direct current signal corresponding to the speed of operation of said motor, means for converting said first signal into a second direct current signal, and means for comparing both of said direct current signals and for developing an alternating current control signal in accordance with the difference of said direct current signals for controlling the speed of operation of said motor.

10. In a fluid flow measuring system wherein means are provided for sensing the rate of fluid flow through a conduit, means responsive to said sensing means for developing an alternating current signal corresponding to the rate of fluid flow, means for converting said alternating current signal into a direct current signal, an amplifier having an input circuit and an output circuit, a variable speed motor connected in the output circuit of said amplifier, means controlled by said motor for developing a direct current signal corresponding to the speed of operation of said motor, means for comparing both of said direct current signals and for developing an alternating control signal in accordance with the difference of said direct current signals and means for coupling said control signal to the input circuit of said amplifier for controlling the speed of operation of said motor.

11. In a fluid flow measuring system wherein means are provided for sensing the rate of fluid flow through a conduit, means responsive to said sensing means for developing an alternating current signal corresponding to the rate of fluid flow, a variable speed motor operated in accordance with said signal, means controlled by said motor for developing a direct current signal substantially proportional to the speed of operation of said motor and of the same polarity as said first signal, means for converting said first signal into a second direct current signal, and means including a synchronous vibrator for comparing both of said direct current signals and for developing an alternating current control signal in accordance with the difference of said direct current signals for controlling the speed of operation of said motor.

References Cited in the file of this patent

UNITED STATES PATENTS

| | | |
|---|---|---|
| 1,185,735 | Trood | June 6, 1916 |
| 1,993,527 | Mears et al. | Mar. 5, 1935 |
| 2,330,427 | Hornfeck | Sept. 28, 1943 |
| 2,367,746 | Williams | Jan. 23, 1945 |
| 2,431,257 | Kellogg | Nov. 18, 1947 |
| 2,445,247 | Griest | Nov. 30, 1948 |
| 2,484,089 | Haynes | Oct. 11, 1949 |
| 2,513,537 | Williams | July 4, 1950 |
| 2,590,528 | Gilbert | Mar. 25, 1952 |
| 2,593,950 | Williams | Apr. 22, 1952 |
| 2,655,040 | Peterson | Oct. 13, 1953 |
| 2,708,258 | Westwood | May 10, 1955 |